United States Patent
Kawada et al.

(10) Patent No.: US 10,483,594 B2
(45) Date of Patent: Nov. 19, 2019

(54) POSITIVE ELECTRODE PLATES FOR NONAQUEOUS ELECTROLYTE SECONDARY BATTERIES, AND NONAQUEOUS ELECTROLYTE SECONDARY BATTERIES

(71) Applicants: Panasonic Corporation, Kadoma-shi, Osaka (JP); Sanyo Electric Co., Ltd., Daito-shi, Osaka (JP)

(72) Inventors: Hiroshi Kawada, Hyogo (JP); Motoharu Saito, Hyogo (JP); Kenichi Hotehama, Osaka (JP); Yoshinori Aoki, Hyogo (JP)

(73) Assignees: PANASONIC CORPORATION, Kadoma-shi (JP); SANYO Electric Co., Ltd., Daito-shi (JP)

( * ) Notice: Subject to any disclaimer, the term of this patent is extended or adjusted under 35 U.S.C. 154(b) by 195 days.

(21) Appl. No.: 15/541,841

(22) PCT Filed: Sep. 29, 2015

(86) PCT No.: PCT/JP2015/004916
§ 371 (c)(1),
(2) Date: Jul. 6, 2017

(87) PCT Pub. No.: WO2016/116971
PCT Pub. Date: Jul. 28, 2016

(65) Prior Publication Data
US 2018/0013173 A1    Jan. 11, 2018

(30) Foreign Application Priority Data
Jan. 20, 2015 (JP) .................... 2015-008551

(51) Int. Cl.
*H01M 4/13* (2010.01)
*H01M 4/48* (2010.01)
(Continued)

(52) U.S. Cl.
CPC ......... *H01M 10/0587* (2013.01); *H01M 4/13* (2013.01); *H01M 4/131* (2013.01);
(Continued)

(58) Field of Classification Search
CPC .......... H01M 4/133; H01M 4/02; H01M 4/13; H01M 4/48; H01M 10/0587; H01M 2/02
See application file for complete search history.

(56) References Cited

U.S. PATENT DOCUMENTS

2001/0012588 A1    8/2001 Kaido et al.
2009/0011333 A1*   1/2009 Wakita ............... H01M 4/133
                                                    429/220
(Continued)

FOREIGN PATENT DOCUMENTS

JP    10-12220 A      1/1998
JP    2009-134916 A   6/2009
(Continued)

OTHER PUBLICATIONS

Machine Translation of: JP 2009/259502 A, Kojima et al., dated Nov. 5, 2009.*

(Continued)

*Primary Examiner* — Kenneth J Douyette
(74) *Attorney, Agent, or Firm* — Westerman, Hattori, Daniels & Adrian, LLP

(57) ABSTRACT

A positive electrode plate (11) includes a current collector (30) and a mixture layer (31) disposed on the current collector (30). The mixture layer (31) has a thin portion (32) with a thickness of less than 200 μm disposed on an inner coil half of the current collector (30) and a thick portion (33) having a larger thickness than the thin portion (32), the thick portion (33) having a yield loop height H measured by a stiffness test of 6 mm<H<15 mm.

9 Claims, 2 Drawing Sheets

(51) Int. Cl.
  *H01M 4/02* (2006.01)
  *H01M 10/0587* (2010.01)
  *H01M 4/131* (2010.01)
  *H01M 4/136* (2010.01)
  *H01M 10/0525* (2010.01)

(52) U.S. Cl.
  CPC ............ *H01M 4/136* (2013.01); *H01M 4/48* (2013.01); *H01M 10/0525* (2013.01); *H01M 2004/021* (2013.01); *H01M 2004/028* (2013.01)

(56) References Cited

U.S. PATENT DOCUMENTS

| 2009/0162739 | A1 | 6/2009 | Han et al. | |
| 2011/0027636 | A1 | 2/2011 | Lee et al. | |
| 2012/0107654 | A1* | 5/2012 | Bhardwaj | H01M 2/0212 429/94 |

FOREIGN PATENT DOCUMENTS

| JP | 2009-259502 A | 11/2009 |
| JP | 2011-138729 A | 7/2011 |
| JP | 2012-501052 A | 1/2012 |
| JP | 2012-53998 A | 3/2012 |
| JP | 2012-59491 A | 3/2012 |
| JP | 2013-137944 A | 7/2013 |
| JP | 2013-140733 A | 7/2013 |
| JP | 2014-107172 A | 6/2014 |
| JP | 2014-179334 A | 9/2014 |

OTHER PUBLICATIONS

International Search Report dated Dec. 8, 2015, issued in counterpart application No. PCT/JP2015/004916. (2 pages).

* cited by examiner

POSITIVE ELECTRODE PLATES FOR NONAQUEOUS ELECTROLYTE SECONDARY BATTERIES, AND NONAQUEOUS ELECTROLYTE SECONDARY BATTERIES

TECHNICAL FIELD

The present disclosure relates to positive electrode plates for nonaqueous electrolyte secondary batteries, and to nonaqueous electrolyte secondary batteries.

BACKGROUND ART

Patent Literature 1 discloses an electrode plate for nonaqueous electrolyte secondary batteries which includes a current collector and a mixture layer formed by coating on the current collector in such a manner that both end portions in the winding direction have smaller thickness toward the ends. Patent Literature 1 describes that such a structure reduces the concentration of stress produced by bending of the electrode plate with a large curvature when the electrode plate is wound, thus making it possible to prevent the electrode plate from rupture.

CITATION LIST

Patent Literature

PTL 1: Japanese Published Unexamined Patent Application No. 2009-134916

SUMMARY OF INVENTION

Technical Problem

Increasing the thickness of a mixture layer to attain a higher capacity makes it difficult for the electrode plate to maintain its straightness, resulting in an increased chance of rupture of the electrode plate particularly on the inner side of the coil.

Solution to Problem

An aspect of the present disclosure resides in a positive electrode plate for wound nonaqueous electrolyte secondary batteries including a current collector and a mixture layer disposed on the current collector, the mixture layer having a thin portion with a thickness of less than 200 μm disposed on an inner coil half of the current collector and a thick portion having a larger thickness than the thin portion, the thick portion having a yield loop height H measured by a stiffness test of 6 mm<H<15 mm.

Another aspect of the present disclosure resides in a nonaqueous electrolyte secondary battery including the above positive electrode plate, a negative electrode plate and a nonaqueous electrolyte.

Advantageous Effects of Invention

The positive electrode plate for nonaqueous electrolyte secondary batteries according to one aspect of the present disclosure is sufficiently resistant to rupture by winding of the electrode plate even when the mixture layer is formed in a large thickness.

DESCRIPTION OF EMBODIMENTS

Figure 1:
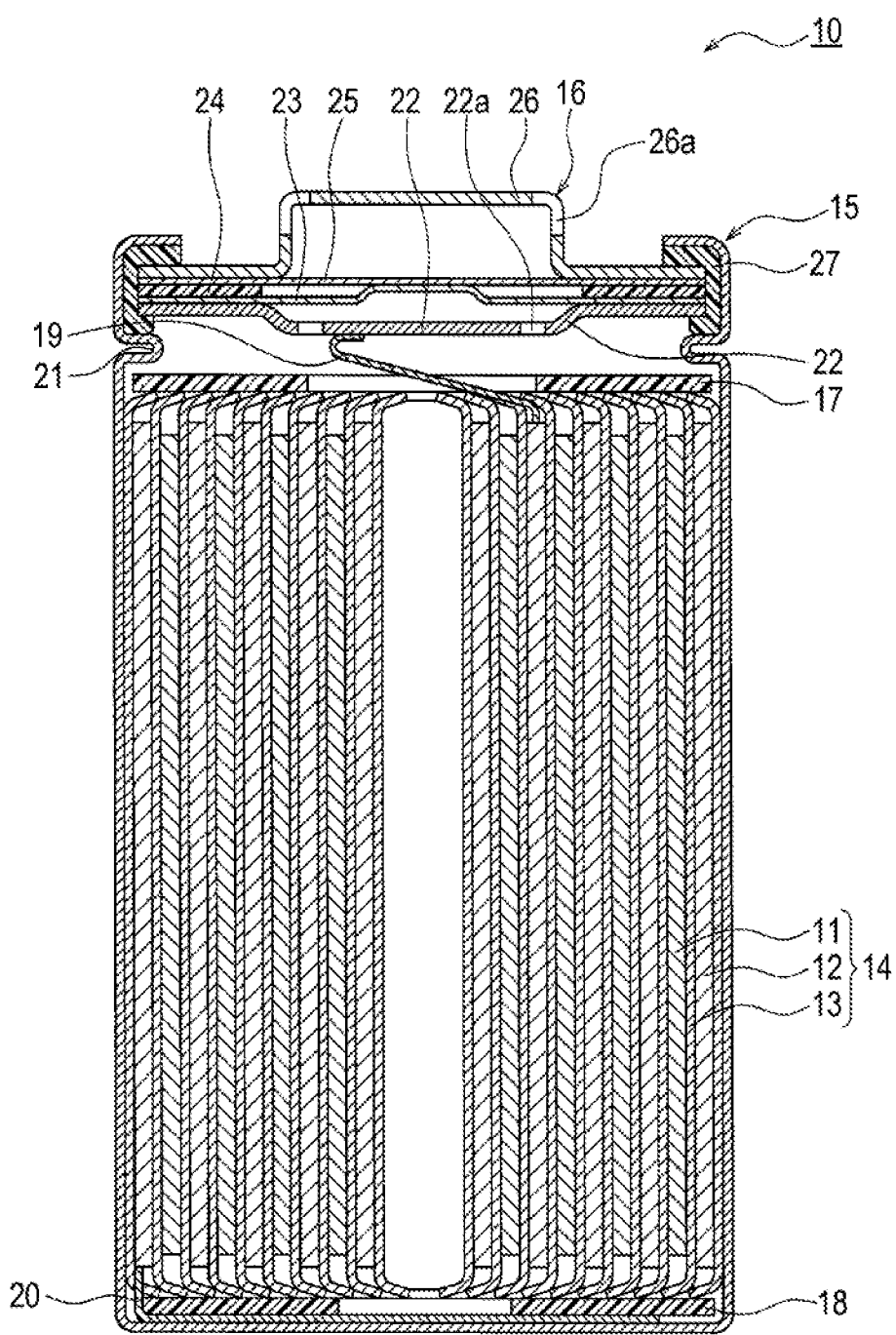
FIG. 1 is a sectional view of a nonaqueous electrolyte secondary battery according to an example embodiment.

[Underlying Knowledge Forming Basis of the Present Disclosure]

In nonaqueous electrolyte secondary batteries, there has been a need for the realization of higher capacity by increasing the thickness of positive electrode mixture layers. However, as mentioned above, increasing the thickness of a mixture layer for higher capacity reduces the straightness of the electrode plate, resulting in a high chance for the electrode plate to rupture particularly on the inner side of the coil. Further, the present inventors have revealed that an electrode plate having a thick mixture layer is not only prone to rupture but also tends to suffer cracking or separation of the mixture layer. The present inventors have found that when, in particular, the thickness of the mixture layer is 200 μm or above, for example, when 100 μm or thicker mixture layers are formed on each side of a current collector and the total thickness of the two layers is 200 μm or above, even the technique disclosed in Patent Literature 1 cannot sufficiently suppress the occurrence of cracking or separation of the mixture layers during winding of the electrode plate. One of the possible factors responsible for such cracking or separation of the mixture layers is the hardening of the electrode plate due to influences such as the migration of binder components associated with the thickening of the mixture layers.

The present inventors carried out extensive studies based on the above findings, thus arriving at a positive electrode plate for nonaqueous electrolyte secondary batteries (hereinafter, simply written as the "positive electrode plate") that forms an aspect of the present disclosure. The positive electrode plate according to one aspect of the present disclosure, in spite of its having a mixture layer with a 200 μm or thicker portion, can be wound while sufficiently suppressing the occurrence of problems such as the rupture of the electrode plate and the cracking and separation of the mixture layer. The positive electrode plate according to one aspect of the present disclosure is prevented from rupture on the inner side of the coil probably by virtue of the provision of a thin portion. Further, the yield loop height H of the thick portion measured by a stiffness test is controlled to the range of 6 mm<H<15 mm, and thereby the electrode plate is designed to exhibit a yield phenomenon at an early stage. As a result, the concentration of stress during winding can be relaxed, and thereby the mixture layer will be prevented from cracking or separation. Thus, the present disclosure can overcome a conventional difficulty encountered in winding a positive electrode plate having a thick mixture layer.

Hereinbelow, an example embodiment will be described in detail.

The drawings used in the description of the embodiment are schematic, and the configurations of the constituents illustrated in the drawings such as sizes are sometimes different from the actual ones. Specific configurations such as sizes should be estimated in consideration of the description given below.

Figure 2:
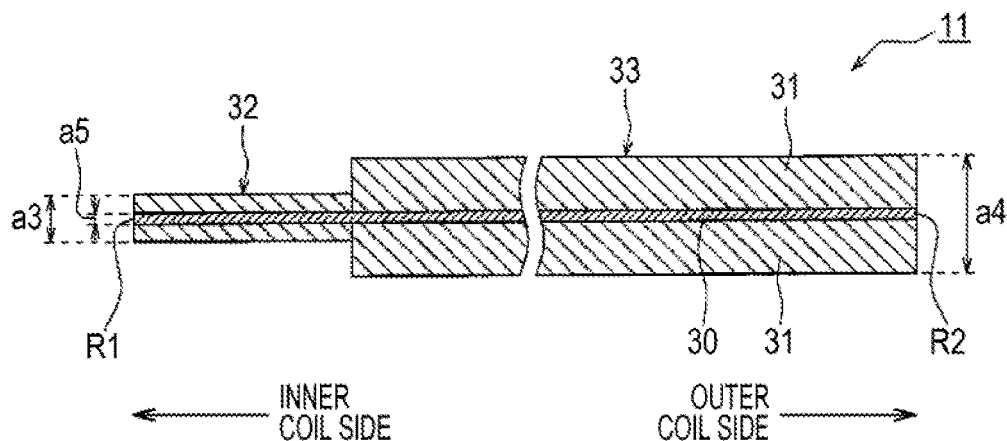
FIG. 2 is a sectional view of a positive electrode plate for nonaqueous electrolyte secondary batteries according to an example embodiment.

FIG. 1 is a sectional view of a nonaqueous electrolyte secondary battery 10 having a positive electrode plate 11 according to an example embodiment. FIG. 2 is a sectional view of the positive electrode plate 11. The positive electrode plate 11 is a wound electrode including a current collector 30 and mixture layers 31 disposed on the current collector 30. The positive electrode plate 11 constitutes an electrode assembly 14 together with a negative electrode 12 and a separator 13. The electrode assembly 14 is a coil of the positive electrode plate 11 and the negative electrode 12 wound via the separator 13. The nonaqueous electrolyte secondary battery 10 has a structure in which the wound electrode assembly 14 and a nonaqueous electrolyte are accommodated in a battery case. Examples of the battery cases include metallic cases such as cylindrical cases and prismatic cases, and resin cases formed by laminating resin sheets (laminate batteries). In the example illustrated in FIG. 1, the battery case is composed of a bottomed cylindrical case body 15 and a sealing body 16.

As illustrated in FIG. 1, the nonaqueous electrolyte secondary battery 10 includes insulating plates 17 and 18 disposed on and under the electrode assembly 14. In the example illustrated in FIG. 1, a positive electrode lead 19 attached to the positive electrode plate 11 extends toward the sealing body 16 through an opening in the insulating plate 17, and a negative electrode lead 20 attached to the negative electrode 12 extends on the outside of the insulating plate 18 along the bottom of the case body 15. For example, the positive electrode lead 19 is connected to the lower surface of a filter 22 that is a bottom plate of the sealing body 16 by a technique such as welding, and a cap 26 that is a top plate of the sealing body 16 is electrically connected to the filter 22 and serves as a positive electrode terminal. The negative electrode lead 20 is connected to the inner bottom surface of the case body 15 by a technique such as welding, and the case body 15 serves as a negative electrode terminal. In the present embodiment, a current interrupt device (CID) and a degassing mechanism (a safety valve) are disposed in the sealing body 16. Preferably, a degassing valve (not shown) is disposed also in the bottom of the case body 15.

The case body 15 is, for example, a bottomed cylindrical container made of a metal. A gasket 27 is disposed between the case body 15 and the sealing body 16, thereby ensuring airtightness inside the battery case. The case body 15 preferably has a protrudent portion 21 which is formed by, for example, pressing a lateral portion by a force applied from the outer side and which supports the sealing body 16. The protrudent portion 21 is preferably formed as a circle along the peripheral direction of the case body 15, and supports the sealing body 16 on its upper surface.

The sealing body 16 has a filter 22 with a filter opening 22a, and a valve disposed on the filter 22. The valve covers the filter opening 22a of the filter 22, and is broken in the event of an increase in the inside pressure of the battery by heat generated due to abnormalities such as internal short-circuits. In the present embodiment, the valve includes a lower valve 23 and an upper valve 25; in addition, an insulating member 24 between the lower valve 23 and the upper valve 25, and a cap 26 having a cap opening 26a are further disposed. For example, the members constituting the sealing body 16 have a disk shape or a ring shape, and the members except the insulating member 24 are electrically connected to one another. Specifically, the filter 22 and the lower valve 23 are joined together at their peripheral portions, and the upper valve 25 and the cap 26 are also joined together at their peripheral portions. The lower valve 23 and the upper valve 25 are connected to each other at their central portions, with the insulating member 24 being disposed between the peripheral portions of the valves. If the inside pressure is elevated by heat due to an abnormality such as internal short-circuit, for example, a thin portion of the lower valve 23 is broken to cause the upper valve 25 to swell toward the cap 26 away from the lower valve 23, thereby interrupting the electrical connection between the valves.

[Positive Electrode Plates]

As illustrated in FIG. 2, the positive electrode plate 11 includes mixture layers 31 (positive electrode mixture layers) disposed on a current collector 30 (a positive electrode current collector), and, as already described, is wound together with the negative electrode 12 and the separator 13 into a coil to form the electrode assembly 14. FIG. 2 illustrates the positive electrode plate 11 before winding, and the left side of the drawing will form the inner coil side (the core side) when wound into the electrode assembly 14. The current collector 30 may be, for example, a foil of a metal that is stable at positive electrode potentials such as aluminum, or a film having a skin layer of such a metal. A preferred current collector 30 is a foil of a metal based on aluminum or aluminum alloy. The thickness a5 of the current collector 30 is, for example, 10 μm to 20 μm.

The mixture layer 31 includes a positive electrode active material, and further includes, for example, a conductive agent and a binder. The mixture layers 31 are preferably formed on both sides of the current collector 30, and are formed in as large a thickness as possible to attain a high capacity as will be described in detail later. The positive electrode plate 11 may be fabricated by, for example, applying a positive electrode mixture slurry including the positive electrode active material and other components such as a conductive agent and a binder onto a current collector 30, and drying and rolling the wet films so as to form mixture layers 31 on both sides of the current collector 30.

Examples of the positive electrode active materials present in the mixture layers 31 include lithium transition metal oxides containing such a transition metal element as Co, Mn or Ni. For example, the lithium transition metal oxide is $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$ or $Li_2MPO_4F$ (M: at least one of Na, Mg, Sc, Y, Mn, Fe, Co, Ni, Cu, Zn, Al, Cr, Pb, Sb and B, $0<x\le1.2$, $0<y\le0.9$, and $2.0\le z\le2.3$). A single one or a mixture of these oxides may be used. For example, a preferred lithium transition metal oxide is a Ni—Co—Mn or Ni—Co—Al composite oxide represented by the general formula $Li_aCo_xNi_yM_{1-x-y}O_2$ ($0.9\le a\le1.2$, $0.01\le x<0.2$, $0.8\le y<1.0$, $0<x+y<1$, and M is a metal element including at least one selected from Mn and Al) in the discharged state or the unreacted state.

The conductive agent may be used in the mixture layers 31 to enhance the electrical conductivity of the positive electrode mixture layers. Examples of the conductive agents include carbon materials such as carbon black (CB), acetylene black (AB), Ketjen black and graphite. These may be used singly, or two or more may be used in combination.

The binder may be used in the mixture layers 31 to enhance the bonding of components such as the positive electrode active material to the surface of the positive electrode current collector while ensuring a good contact between the positive electrode active material and the conductive agent. Examples of the binders include fluororesins such as polytetrafluoroethylene (PTFE) and polyvinylidene fluoride (PVdF), polyacrylonitrile (PAN), polyimide resins, acrylic resins and polyolefin resins. These resins may be used in combination with carboxymethylcellulose (CMC) or salts thereof (such as CMC-Na, CMC-K and CMC-NH$_4$, and partially neutralized salts), polyethylene oxide (PEO) and the like. These may be used singly, or two or more may be used in combination.

The mixture layer 31 has a thin portion 32 disposed on an inner coil half of the current collector 30 and a thick portion 33 having a larger thickness than the thin portion 32. Here, the term "inner coil half" is a portion that lies between the center of the current collector 30 in the winding direction and the inner coil end R1. (An outer coil half is a portion that lies between the center of the current collector 30 in the winding direction and the outer coil end R2.) The thickness a1 of the thin portion 32 is less than 200 μm, and the thin portion 32 serves to prevent the rupture of the positive electrode plate 11 during winding. Because the mixture layers 31 are formed on both sides of the current collector 30, the thickness a1 of the thin portion 32 is less than 200 μm as the total of the thicknesses on both sides of the current collector 30. The thin portions 32 disposed on both sides of the current collector 30 preferably have a substantially identical thickness.

The thickness a1 of the thin portion 32 may be obtained by subtracting the thickness a5 of the current collector 30 from the thickness a3 of the positive electrode plate 11 in the thin portion 32, and is preferably not less than 100 μm and not more than 180 μm, and more preferably not less than 110 μm and not more than 170 μm. The thickness a1 of the thin portion 32 on one side of the current collector 30 is preferably not less than 50 μm and not more than 90 μm, and more preferably not less than 55 μm and not more than 85 μm. As will be described in detail later, the thickness a2 of the thick portion 33 is 200 μm or above and the yield loop height H of the thick portion 33 measured by a stiffness test is 6 mm<H<15 mm. By forming such a thick portion 33, an increase in capacity may be attained while preventing the mixture layers 31 from problems such as cracking and separation during winding. The thickness a2 of the thick portion 33 may be obtained by subtracting the thickness a5 of the current collector 30 from the thickness a4 of the positive electrode plate 11 in the thick portion 33.

The thin portion 32 is preferably formed only on the inner coil half of the current collector 30, and is more preferably formed only in the vicinity of the inner coil end R1, specifically, only in a region from the inner coil end R1 to less than 20% of the length in the winding direction (hereinafter, written simply as the "length") of the current collector 30. In order to attain an increase in capacity with good efficiency while suppressing the rupture of the positive electrode plate 11 on the inner coil side, it is particularly preferable that the thin portion 32 be formed in a region from the inner coil end R1 to 5% to 20% of the length of the current collector 30. In other words, the thick portion 33 is formed to extend from the outer coil end R2 of the current collector 30 beyond the border of the inner coil half, more preferably is formed in a region from the outer coil end R2 to not less than 80% of the length of the current collector 30, and particularly preferably is formed in a region from the outer coil end R2 to 80% to 95% of the length of the current collector 30.

The ratio (a1/a2) of the thickness a1 of the thin portion 32 to the thickness a2 of the thick portion 33 is less than 1, preferably 0.4<(a1/a2)<0.8, more preferably 0.4<(a1/a2) <0.7, and particularly preferably 0.45<(a1/a2)<0.65. The ratio (a1/a2) in this range ensures that the rupture of the electrode plate can be suppressed efficiently. While the example shown in FIG. 2 illustrates the mixture layers 31 as having a sharp change in thickness at the border between the thin portion 32 and the thick portion 33 to form a step at the border, other configurations are also possible. For example, the thin portion 32 may be gradually increased in thickness toward the thick portion 33 so as to smooth the change in thickness at the border.

The thickness a2 of the thick portion 33 is 200 μm or above as the total of the thicknesses on both sides of the current collector 30, and is preferably not less than 220 μm and not more than 320 μm, and more preferably not less than 230 μm and not more than 310 μm. The thick portions 33 disposed on both sides of the current collector 30 preferably have a substantially identical thickness. Thus, the thickness a2 of the thick portion 33 on one side of the current collector 30 is preferably not less than 110 μm and not more than 160 μm, and more preferably not less than 115 μm and not more than 155 μm. For example, the thickness a2 is substantially the same along the winding direction.

Figure 3:
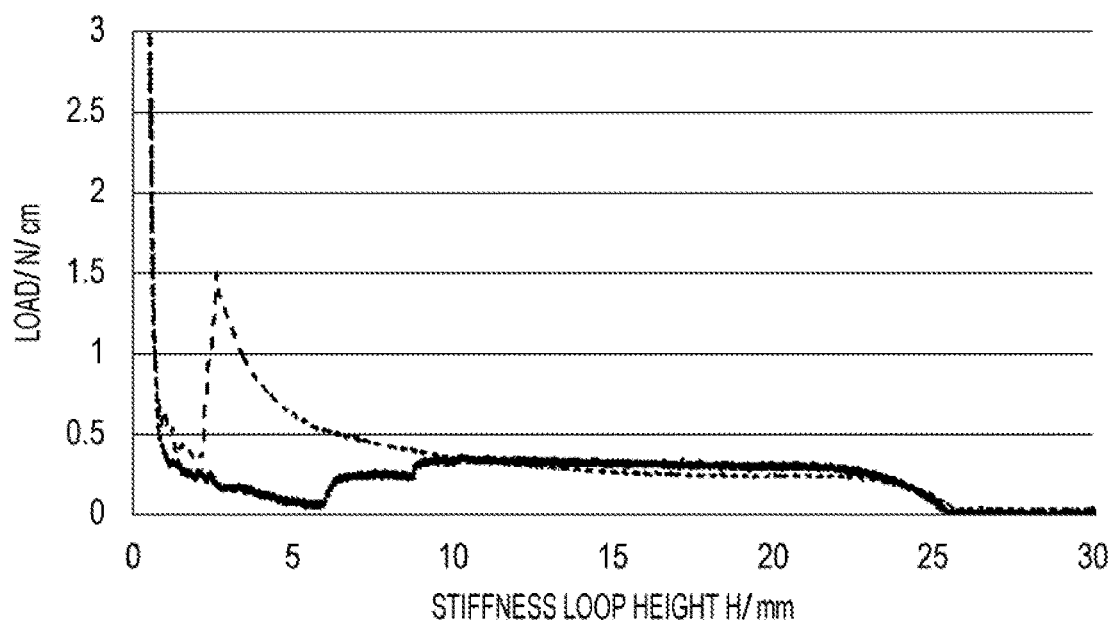
FIG. 3 is a diagram which compares the results of a stiffness test of a thick portion of a positive electrode plate for nonaqueous electrolyte secondary batteries according to an example embodiment, to the results of a positive electrode plate of Comparative Example.

FIG. 3 is a diagram illustrating the results (actual line) of a stiffness test of the positive electrode plate 11. The broken line indicates the test results of a positive electrode plate of Comparative Example 1 described later. In the positive electrode plate 11, the thick portion 33 has a yield loop height H measured by a stiffness test of 6 mm<H<15 mm. In the example illustrated in FIG. 3, the yield loop height H is in the range of 5 mm to 10 mm. On the other hand, the yield loop height H of the positive electrode plate of Comparative Example 1 is less than 5 mm (2.6 mm).

The stiffness test is a test in which the peripheral surface of the positive electrode plate (the thick portion) rolled into a cylinder is pressed at a prescribed rate. The specific test procedures are described below.

(1) A portion, of the positive electrode plate 11, which has the thick portion 33 is cut to a length of 8 cm to give an electrode plate test piece. Both ends of the test piece are butted to form a cylinder having a diameter of 2.55 cm.

(2) The electrode plate test piece in the form of a cylinder is arranged between a vertically movable upper plate and a lower plate having a fixing tool. The butt joint of the cylinder is fixed using the fixing tool of the lower plate.

(3) The upper plate is moved downward at a rate of 100 mm/min to press the peripheral surface of the cylinder. During this process, the stress produced in the cylinder is measured and the inflection point at which the stress decreases sharply is measured. The position of the upper plate at the detection of the inflection point is measured. The distance between the upper plate and the lower plate at the detection of the inflection point is the yield loop height H of the thick portion 33 in the stiffness test.

The yield loop height H of the thick portion 33 is 6 mm<H<15 mm, preferably 6 mm<H<12 mm, more preferably 6.5 mm<H<10 mm, and particularly preferably 7 mm<H<9.5 mm. The positive electrode plate 11 is designed so that the thick portion 33 exhibits a yield phenomenon at a low load. This designing suppresses, for example, the migration of binder components associated with the thickening of the mixture layers and consequently prevents the mixture layers 31 from cracking or separation during winding of the electrode assembly 14. That is, if the yield loop height H of the thick portion is less than 6 mm, problems such as cracking of the mixture layers are encountered during, for example, winding of the electrode assembly. Any yield loop height H of the thick portion exceeding 15 mm is not preferable because such a positive electrode plate is likely to yield during, for example, processing or storage of the electrode assembly and is difficult to handle.

The yield loop height H of the thick portion 33 may be controlled to the range of 6 mm<H<15 mm by, for example, repeating a step of applying the positive electrode mixture slurry or a step of drying the wet films during the formation of the thick portion 33. When, for example, a thick portion 33 having a thickness of 110 μm to 160 μm per side of the current collector 30 is to be formed, the yield loop height H of the thick portion 33 may be controlled to the above range by repeating 2 to 5 times the application and/or drying of the positive electrode mixture slurry.
[Negative Electrode Plates]

For example, the negative electrode plate 12 is composed of a negative electrode current collector such as a metallic foil, and a negative electrode mixture layer disposed on the current collector. The negative electrode current collector may be, for example, a foil of a metal that is stable at negative electrode potentials such as copper, or a film having a skin layer of such a metal. The negative electrode mixture layer includes a negative electrode active material, and preferably further includes a binder. The negative electrode may be fabricated by, for example, applying a negative electrode mixture slurry including the negative electrode active material and other components such as a binder onto a negative electrode current collector, and drying and rolling the wet films so as to form negative electrode mixture layers on both sides of the current collector. For example, the thickness of the negative electrode current collector is 5 μm to 20 μm. The thickness of the negative electrode mixture layers as the total of the thicknesses on both sides of the negative electrode current collector is, for example, about 150 μm.

The negative electrode active material is not particularly limited as long as it can reversibly store and release lithium ions. Examples include carbon materials such as natural graphite and artificial graphite, metals which can be alloyed with lithium such as Si and Sn, and alloys and composite oxides containing metal elements such as Si and Sn. A single or a mixture of these materials may be used. For example, the negative electrode active material may be a mixture of graphite and a silicon oxide represented by $SiO_x$ ($0.8 \leq x \leq 1.5$).

Examples of the binders present in the negative electrode mixture layers include, similarly to those in the positive electrode plates, fluororesins, PAN, polyimide resins, acrylic resins and polyolefin resins. When the negative electrode mixture slurry is prepared using an aqueous solvent, it is preferable to use styrene-butadiene rubber (SBR), CMC or a salt thereof, polyacrylic acid (PAA) or a salt thereof (such as PAA-Na or PAA-K, or a partially neutralized salt), polyvinyl alcohol (PVA) or the like.
[Separators]

As the separator 13, a porous sheet having ion permeability and insulating properties is used. Specific examples of the porous sheets include microporous thin films, woven fabrics and nonwoven fabrics. Some preferred materials of the separators 13 are olefin resins such as polyethylene and polypropylene, and celluloses. The separator 13 may be a stack having a cellulose fiber layer and a thermoplastic resin fiber layer such as of an olefin resin. Alternatively, the separator may be a multilayered separator including a polyethylene layer and a polypropylene layer, or may be one having a coating of an aramid resin or the like on the surface of the separator 13. For example, the thickness of the separator 13 is 10 μm to 20 μm.

A filler layer including an inorganic filler may be disposed in the interface of the separator 13 and at least one of the positive electrode plate 11 and the negative electrode 12. Examples of the inorganic fillers include oxides containing at least one of titanium (Ti), aluminum (Al), silicon (Si) and magnesium (Mg), and phosphoric acid compounds. For example, the filler layer may be formed by applying a slurry containing the filler onto the surface of the positive electrode plate 11, the negative electrode plate 12 or the separator 13.
[Nonaqueous Electrolytes]

The nonaqueous electrolyte includes a nonaqueous solvent and an electrolyte salt dissolved in the nonaqueous solvent. The nonaqueous electrolytes are not limited to liquid electrolytes (nonaqueous electrolytic solutions), and may be solid electrolytes such as gelled polymer electrolytes. Examples of the nonaqueous solvents include esters, ethers, nitriles such as acetonitrile, amides such as dimethylformamide, and mixed solvents including two or more of these solvents. The nonaqueous solvent may include a halogenated compound resulting from the substitution of any of the above solvents with halogen atoms such as fluorine in place of at least part of the hydrogen atoms.

Examples of the esters include cyclic carbonate esters such as ethylene carbonate (EC), propylene carbonate (PC) and butylene carbonate, chain carbonate esters such as dimethyl carbonate (DMC), methyl ethyl carbonate (EMC), diethyl carbonate (DEC), methyl propyl carbonate, ethyl propyl carbonate and methyl isopropyl carbonate, cyclic carboxylate esters such as γ-butyrolactone and γ-valerolactone, and chain carboxylate esters such as methyl acetate, ethyl acetate, propyl acetate, methyl propionate (MP), ethyl propionate and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl.

Some preferred halogenated compounds are fluorinated cyclic carbonate esters such as fluoroethylene carbonate (FEC), fluorinated chain carbonate esters, and fluorinated chain carboxylate esters such as fluoro methyl propionate (FMP).

The electrolyte salt is preferably a lithium salt. Examples of the lithium salts include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, chloroborane lithium, lithium lower aliphatic carboxylates, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m are integers of 1 or greater}. The lithium salt may be a single salt or a mixture of a plurality of salts. Of these, from points of view such as ion conductivity and electrochemical stability, $LiPF_6$ is preferably used. The concentration of the lithium salt is preferably 0.8 to 1.8 mol per 1 L of the nonaqueous solvent.

EXAMPLES

Hereinbelow, the present disclosure will be described in greater detail based on EXAMPLES. The scope of the present disclosure is not limited to such EXAMPLES.

Example 1

[Fabrication of Positive Electrode Plate]

100 Parts by weight of lithium nickel cobalt aluminum composite oxide represented by $LiNi_{0.88}Co_{0.09}Al_{0.03}O_2$ as a positive electrode active material, 1 part by weight of acetylene black (AB) and 1 part by weight of polyvinylidene fluoride (PVdF) were mixed together. Further, an appropriate amount of N-methyl-2-pyrrolidone (NMP) was added. A positive electrode mixture slurry was thus prepared.

Next, the positive electrode mixture slurry was applied to both sides of a 15 μm thick positive electrode current collector composed of an aluminum foil. The wet films were dried to form positive electrode mixture layers having a thin portion and a thick portion, on both sides of the positive electrode current collector. The thin portion was formed only in a region from the inner coil end of the positive electrode current collector to 10% of the length of the current collector in the winding direction. The other region was defined by the thick portion. The following describes a specific method for forming positive electrode mixture layers having a thin portion and a thick portion.

(1) An amount of the positive electrode mixture slurry corresponding to the amount of a thin portion is applied to both sides of the positive electrode current collector. The wet films are dried.

(2) The positive electrode mixture slurry is applied again over the mixture layers formed in (1), and the wet films are dried to form a thick portion. During this process, a coating pattern was used to leave the thin portion on the inner coil end side.

The sheet was cut to a prescribed electrode size and was rolled with a roller. Consequently, a positive electrode plate was fabricated which had the positive electrode mixture layers on both sides of the positive electrode current collector. The results of the stiffness test are illustrated in FIG. 3 (actual line).

[Fabrication of Negative Electrode Plate]

4 Parts by weight of carbon-coated silicon oxide (SiO) particles as a negative electrode active material, 96 parts by weight of a graphite powder (C), 1 part by weight of carboxymethylcellulose (CMC) and 1 part by weight of styrene-butadiene rubber (SBR) were mixed together. Further, an appropriate amount of water was added. A negative electrode mixture slurry was thus prepared. Next, the negative electrode mixture slurry was applied to both sides of a negative electrode current collector composed of an 8 μm thick copper foil. The wet films were dried. The sheet was cut to a prescribed electrode size and was rolled with a roller. Consequently, a negative electrode plate was fabricated which had the negative electrode mixture layers on both sides of the negative electrode current collector. The thickness of the negative electrode mixture layers was about 75 μm per side of the negative electrode current collector, and was about 150 μm as the total on both sides.

[Fabrication of Electrode Assembly]

The positive electrode plate and the negative electrode plate were wound into a coil via a polyethylene separator (15 μm in thickness). A wound electrode assembly was thus fabricated.

Example 2

A positive electrode plate and an electrode assembly were fabricated in the same manner as in EXAMPLE 1, except that the amount of the slurry applied to form the thin portion was reduced to control the thickness a1 of the thin portion to 136 μm.

Example 3

A positive electrode and an electrode assembly were fabricated in the same manner as in EXAMPLE 1, except that the amount of the slurry applied to form the thick portion was increased to control the thickness a2 of the thick portion to 300 μm and to control the yield loop height H in the stiffness test to 7.5 mm.

Comparative Example 1

A positive electrode and an electrode assembly were fabricated in the same manner as in EXAMPLE 1, except that the application and drying steps were performed one time and the amount of the slurry was controlled to form positive electrode mixture layers in a uniform thickness (250 μm) over the entire length of the positive electrode current collector, and the yield loop height H in the stiffness test was 2.6 mm. The results of the stiffness test are illustrated in FIG. 3 (broken line).

Comparative Example 2

A positive electrode and an electrode assembly were fabricated in the same manner as in COMPARATIVE EXAMPLE 1, except that the application and drying steps were performed two times to form positive electrode mixture layers in the uniform thickness over the entire length, and the yield loop height H in the stiffness test was thereby controlled to 7.5 mm.

Comparative Example 3

A positive electrode having a thin portion and a thick portion, and an electrode assembly were fabricated in the same manner as in EXAMPLE 3, except that the application and drying steps for the thick portion were performed one time and the amount of the slurry was controlled to control the yield loop height H in the stiffness test to 1.4 mm.

The positive electrode plates and the electrode assemblies obtained in EXAMPLES 1 to 3 and COMPARATIVE EXAMPLES 1 to 3 were tested by the following stiffness test to measure the yield loop height H and were inspected by the method described below to evaluate the appearance of the electrode assembly (the positive electrode plate).

[Stiffness Test]

(1) A portion, of the positive electrode plate, which has the thick portion is cut to a length of 8 cm to give an electrode plate test piece. Both ends of the test piece are butted to form a cylinder having a diameter of 2.55 cm.

(2) The electrode plate test piece in the form of a cylinder is arranged between a vertically movable upper plate and a lower plate having a fixing tool. The butt joint of the cylinder is fixed using the fixing tool of the lower plate.

(3) The upper plate is moved downward at a rate of 100 mm/min to press the peripheral surface of the cylinder. During this process, the stress produced in the cylinder is measured and the inflection point at which the stress decreases sharply is measured. The position of the upper plate at the detection of the inflection point is measured. The distance between the upper plate and the lower plate at the detection of the inflection point is the yield loop height H of the thick portion 33 in the stiffness test.

[Evaluation of Appearance of Positive Electrode Plate]

The positive electrode plates were removed from the electrode assemblies and were inspected for the presence or absence of defects such as rupture of the electrode plate, and cracking or separation of the mixture layers, based on the following criteria.

◯: Defects such as rupture of the electrode plate, and cracking or separation of the mixture layers were absent.

x: Defects such as rupture of the electrode plate, and cracking or separation of the mixture layers were present.

TABLE 1

|  | Thickness of positive electrode mixture layers (μm) | | | Yield loop height H | Appearance |
| --- | --- | --- | --- | --- | --- |
|  | a1 | a2 | a1/a2 | (mm) | evaluation |
| EX. 1 | 150 | 250 | 0.6 | 8.8 | ◯ |
| EX. 2 | 136 | 250 | 0.54 | 8.8 | ◯ |
| EX. 3 | 150 | 300 | 0.5 | 7.5 | ◯ |
| COMP. EX. 1 |  | 250 | 1 | 2.6 | x |
| COMP. EX. 2 |  | 250 | 1 | 7.5 | x |
| COMP. EX. 3 | 150 | 300 | 0.5 | 1.4 | x |

As shown by the results described in Table 1, the positive electrode plates of EXAMPLES were free from defects such as rupture of the electrode plate, and cracking or separation of the mixture layers caused by the winding of the electrode assembly. In contrast, the positive electrode plate of COMPARATIVE EXAMPLE 1 suffered rupture of the electrode plate and cracking of the mixture layers; the positive electrode plate of COMPARATIVE EXAMPLE 2 suffered rupture of the electrode plate; and the positive electrode plate of COMPARATIVE EXAMPLE 3 suffered cracking of the mixture layers.

INDUSTRIAL APPLICABILITY

The present invention may be used in positive electrode plates for nonaqueous electrolyte secondary batteries, and in nonaqueous electrolyte secondary batteries.

REFERENCE SIGNS LIST

10 NONAQUEOUS ELECTROLYTE SECONDARY BATTERY
11 POSITIVE ELECTRODE PLATE
12 NEGATIVE ELECTRODE
13 SEPARATOR
14 ELECTRODE ASSEMBLY
15 CASE BODY
16 SEALING BODY
17, 18 INSULATING PLATES
19 POSITIVE ELECTRODE LEAD
20 NEGATIVE ELECTRODE LEAD
21 PROTRUDENT PORTION
22 FILTER
22a FILTER OPENING
23 LOWER VALVE
24 INSULATING MEMBER
25 UPPER VALVE
26 CAP
26a CAP OPENING
27 GASKET
30 CURRENT COLLECTOR
31 MIXTURE LAYER
32 THIN PORTION
33 THICK PORTION
a3, a4 ELECTRODE PLATE THICKNESS
a5 CURRENT COLLECTOR THICKNESS
R1 INNER COIL END
R2 OUTER COIL END

The invention claimed is:

1. A positive electrode plate for wound nonaqueous electrolyte secondary batteries, comprising:
a current collector, and
a mixture layer disposed on the current collector,
the mixture layer having a thin portion with a thickness of less than 200 μm disposed on an inner coil half of the current collector and a thick portion having a larger thickness than the thin portion, the thick portion having a yield loop height H measured by a stiffness test of 6 mm<H<15 mm.

2. The positive electrode plate for nonaqueous electrolyte secondary batteries according to claim 1, wherein the thickness of the thick portion is 200 μm or above.

3. The positive electrode plate for nonaqueous electrolyte secondary batteries according to claim 1, wherein the ratio (a1/a2) of a thickness (a1) of the thin portion to a thickness (a2) of the thick portion is 0.4<(a1/a2)<0.8.

4. The positive electrode plate for nonaqueous electrolyte secondary batteries according to claim 1, wherein the thin portion is formed only in a region from an inner coil end of the current collector to less than 20% of the length in the winding direction of the current collector.

5. The positive electrode plate for nonaqueous electrolyte secondary batteries according to claim 1, wherein the mixture layers are disposed on both sides of the current collector,
a thickness (a1) of the thin portion is not less than 100 μm and not more than 180 μm as the total of the thicknesses on both sides of the current collector, and
a thickness (a2) of the thick portion is not less than 220 μm and not more than 320 μm as the total of the thicknesses on both sides of the current collector.

6. A nonaqueous electrolyte secondary battery comprising:
the positive electrode plate for nonaqueous electrolyte secondary batteries described in claim 1,
a negative electrode plate, and
a nonaqueous electrolyte.

7. The positive electrode plate for nonaqueous electrolyte secondary batteries according to claim 1, wherein the thickness of the thick portion is substantially the same along a winding direction.

8. The positive electrode plate for nonaqueous electrolyte secondary batteries according to claim 7, wherein the mixture layers have a step at the border between the thin portion and the thick portion.

9. The positive electrode plate for nonaqueous electrolyte secondary batteries according to claim 7, wherein the thin portion is gradually increased in thickness toward the thick portion.

* * * * *